United States Patent [19]

Newhouse

[11] Patent Number: 4,458,490
[45] Date of Patent: Jul. 10, 1984

[54] DUAL POWER BRAKE BOOSTER AND METHOD OF GENERATING BRAKE ACTUATING PRESSURE

[75] Inventor: Delbert W. Newhouse, Dayton, Ohio

[73] Assignee: General Motors Corporation, Detroit, Mich.

[21] Appl. No.: 424,035

[22] Filed: Sep. 27, 1982

[51] Int. Cl.³ .............................................. B60T 13/60
[52] U.S. Cl. .................................... 60/547.1; 60/548; 60/574; 60/581; 60/582
[58] Field of Search ...................... 60/547.1, 548, 574, 60/582, 581

[56] References Cited

U.S. PATENT DOCUMENTS

| | | | |
|---|---|---|---|
| 4,072,085 | 2/1978 | Soupal | 60/548 |
| 4,107,926 | 8/1978 | Adachi | 60/548 |
| 4,110,985 | 9/1978 | Gordon et al. | 60/548 |
| 4,198,823 | 4/1980 | Mathues et al. | 60/581 |

Primary Examiner—Robert E. Garrett
Assistant Examiner—Scott L. Moritz
Attorney, Agent, or Firm—D. D. McGraw

[57] ABSTRACT

A dual power brake booster assembly in which the hydraulic boost section is initially operated, the vacuum booster section is then operated to runout while the hydraulic section maintains a hydraulic boosted force level, the hydraulic section is then further operated to further increase the hydraulic boosted force as the vacuum booster section maintains the vacuum boosted force level attained by it at runout, and additional master cylinder actuation by additional manual force. The invention also includes the method of generating brake actuating pressure. The brake booster assembly may be operated only to the extent necessary to produce the desired amount of master cylinder actuation. The booster assembly will operate when the power source for one section is diminished or not available. It is also operable manually when pressure from neither power source is available.

7 Claims, 4 Drawing Figures

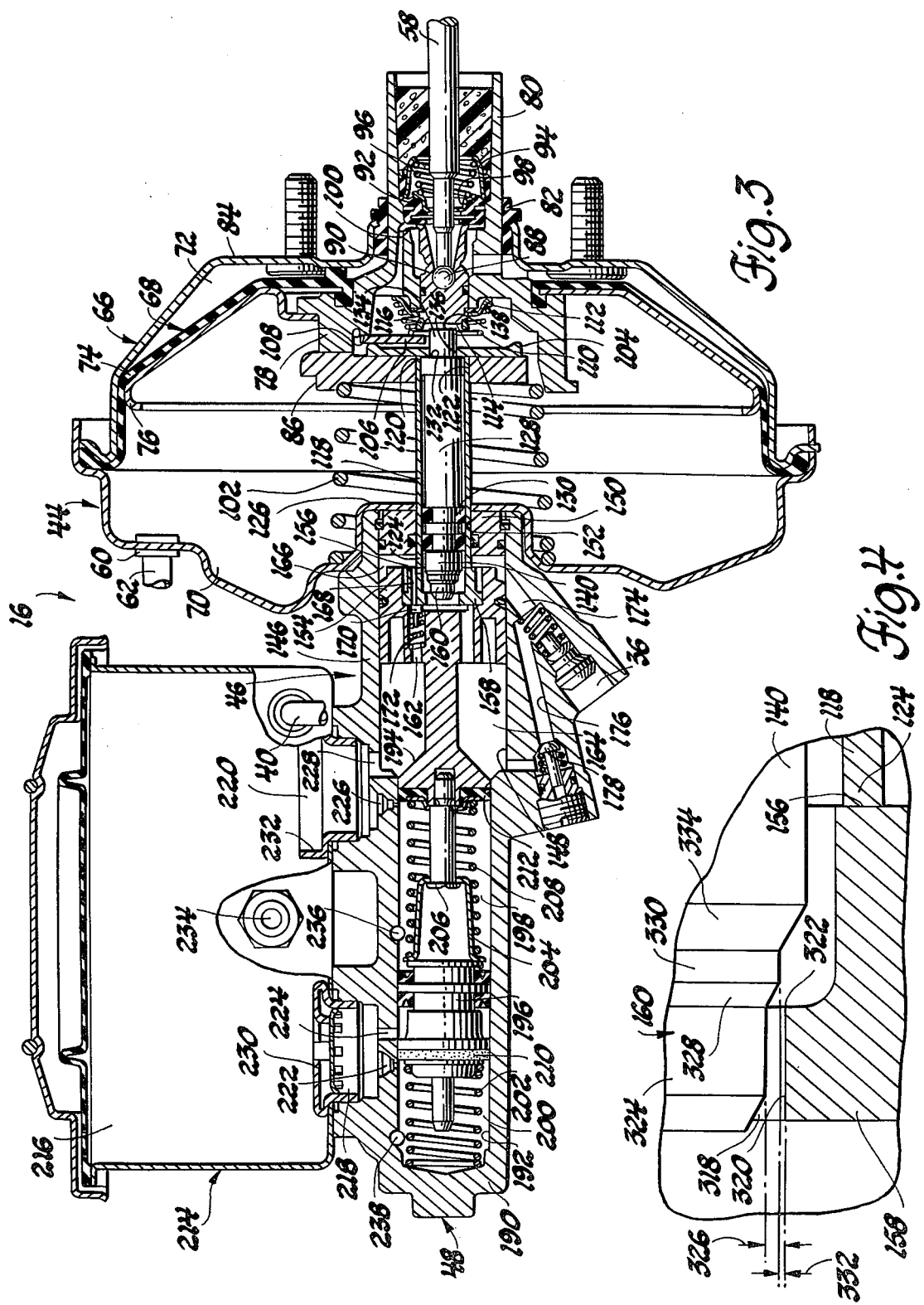

DUAL POWER BRAKE BOOSTER AND METHOD OF GENERATING BRAKE ACTUATING PRESSURE

The invention relates to a dual power brake booster assembly having separate sources of power and separate power sections, the power sections being operable to actuate a master cylinder to pressurize hydraulic brake fluid in vehicle brake circuits. It also relates to a method practiced by the use of such an assembly. It is a feature of the invention to practice the method of generating brake actuating pressure by providing force transmitting paths and valve operating mechanisms interconnecting the two power booster sections so that one section is initially operated to a boosted force level somewhat less than runout. The other section is then operated while the one section continues to have a substantially constant boosted force output, the other section being operated to runout. Shortly before the other section reaches runout, the one section is further operated to increase its power boost force output until that section also reaches runout. The transition points between booster section operation sequences are blended to provide a smooth transition at each point. Should still further master cylinder operation be required, the assembly may be actuated with additional manual effort. The invention also relates to the particular valve arrangement which makes the method of operation occur. The assembly is operated only to the extent that the desired master cylinder actuating force is generated. Thus in light or medium braking, the assembly will not be required to operate through the entire operational range.

IN THE DRAWINGS

FIG. 3 is a cross section view of a brake booster and master cylinder assembly embodying structure by which the invention may be practiced.

FIG. 4 is a fragmentary enlargement of the hydraulic booster control valve of the assembly of FIG. 3, shown in a cross section with parts broken away.

Figure 1:
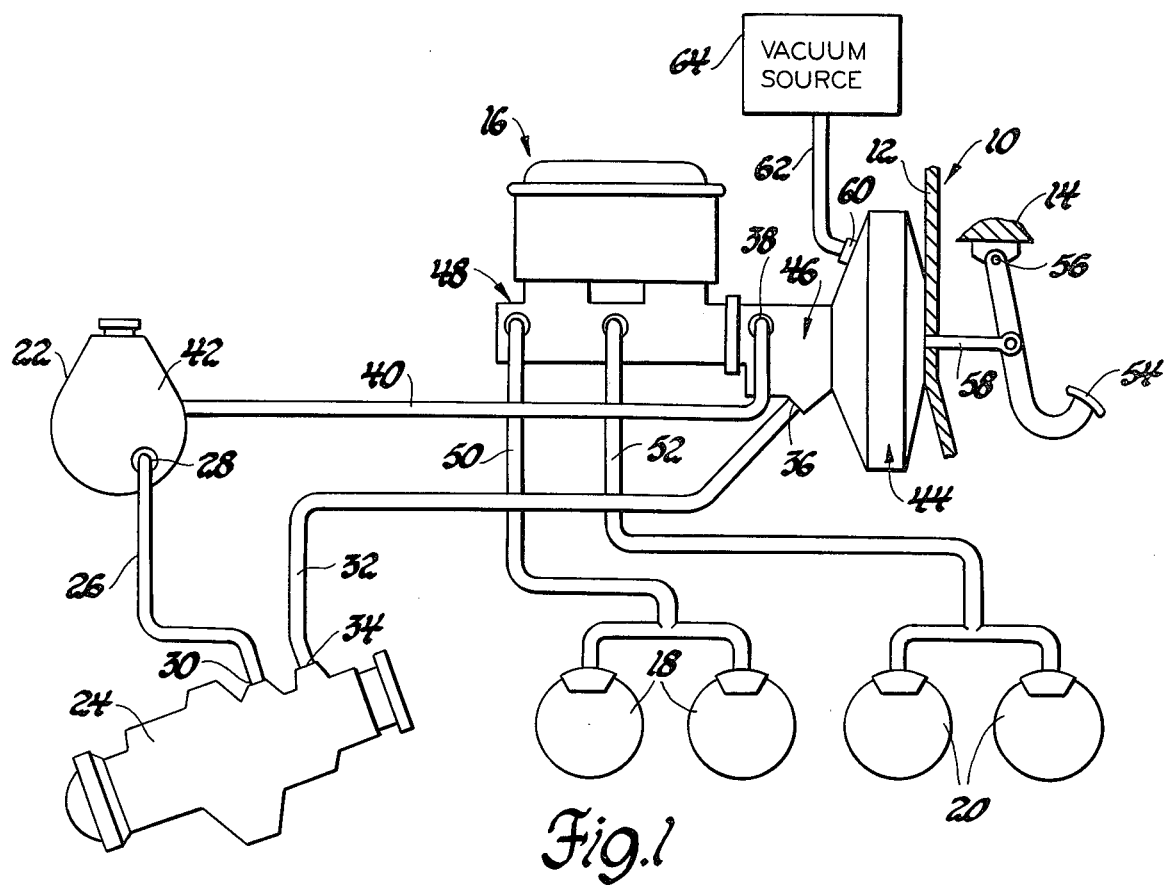
FIG. 1 is a schematic representation of a brake system embodying structure by which the invention may be practiced.

The vehicle 10, schematically represented by vehicle portions such as the firewall 12 and a support member 14, is provided with a brake booster and master cylinder assembly 16 embodying the invention. Certain other portions of the vehicle are also schematically illustrated and include the vehicle front wheel brakes 18, rear wheel brakes 20, a pump 22, power steering gear 24, and suitable conduits. The conduits include conduit 26, which interconnects pump 22 and the power steering gear 24 to conduct hydraulic fluid from the pump output port 28 to the power steering gear input port 30. Conduit 32 connects the power steering gear output port 34 with the hydraulic fluid input port 36 of assembly 16. The hydraulic fluid output port 38 of assembly 16 is connected by conduit 40 to the pump 22. In the system schematically illustrated, pump 22 has a fluid reservoir section 42 into which conduit 40 delivers hydraulic fluid. Pump 22 need not be provided with a reservoir 42 if the master cylinder reservoir acts as the hydraulic fluid system reservoir. Conduit 40 is then connected between that reservoir and the pump. This arrangement is shown in FIG. 3 and is described below in further detail.

The assembly 16 includes a differential air pressure operated booster section 44, a hydraulic fluid pressure operated section 46, and a master cylinder section 48. The master cylinder section has brake actuating pressure conduits 50 and 52 respectively connecting the pressurizing chambers of the master cylinder with the front wheel brakes 18 and the rear wheel brakes 20. A brake pedal assembly 54 is pivotally mounted on the vehicle support member 14 at pivot 56 and is also connected to push rod 58 to move the push rod generally axially to control the assembly 16 and transmit manual force thereto. The booster section 44 is illustrated as being of the vacuum suspended type and is connected by check valve 60 and conduit 62 to a suitable source of vacuum such as the vehicle engine intake manifold 64.

FIG. 3 shows the assembly 16 in cross section and in greater detail. The booster section 44, which may be considered to be the first booster section since it is the first section forward of the brake pedal and push rod, is a vacuum suspended brake booster of the general type disclosed in U.S. Pat. No. 3,249,021, entitled "Power Brake Booster". It is essentially a single diaphragm, vacuum suspended booster having a lever reaction system. It has a housing 66 which has a movable power wall 68 received therein and dividing the housing into a substantially constant pressure chamber 70 and a variable pressure chamber 72. Vacuum is maintained in chamber 70 by check valve 60 and the usual operation of the vehicle engine to which the booster is connected by conduit 62. The power wall 68 includes a diaphragm 74, a diaphragm support 76, and a piston 78 to which the diaphragm and its support are secured. Piston 78 has a rearward extension 80 which is slidable through a seal and bearing 82 provided in the rear section 84 of housing 66. A reaction retainer 86 is removably secured to piston 78. The push rod 58 has a ball end 88 received in a pocket of the air valve 90. Valve 90 is the input member of the valve mechanism which controls this booster section. Ball 88 is staked in place to provide a pivotal connection between rod 58 and air valve 90 but otherwise effectively joining them together as an input member. The air valve 90 is adapted for sliding movement through a portion of piston 78 and is arranged to meter the flow of atmospheric air to chamber 72. A floating valve 92 engages the inside wall of extension 80 of piston 78 and is held in its operative position by a retainer 94. Another portion of the floating valve 92 is maintained in engagement with the air valve 90 when the booster section is in the released position by a spring 96 and cup 98. A vacuum valve 100 is formed as a part of power piston 78 and when the booster section is in the released position floating valve 92 is slightly spaced from this valve so that vacuum is communicated from chamber 70 to chamber 72 through appropriate passages.

As is well known in the operation of this type of booster control mechanism, leftward movement of push rod 58 and air valve 90, as viewed in FIG. 3, permits floating valve 92 to engage vacuum valve 100 to close the vacuum connection between chamber 70 and 72. Futher movement of the air valve 90 causes the air valve to open relative to floating valve 92 and meter air at atmospheric pressure into chamber 72. This creates a pressure differential across power wall 68, moving the power wall leftwardly against the force of the power wall return spring 102. This also moves vacuum valve 100 and floating valve 92 leftwardly until the floating valve reengages air valve 90. The booster is then in the posed position, holding this position since both the air valve and the vacuum valve are closed. Release of the brake pedal by the operator allows push rod 58 and air valve 90 to move rightwardly, lifting floating valve 92 off of vacuum valve 100, thereby reestablishing the vacuum connection between chamber 70 and 72 and decreasing the differential pressure across power wall 68 so that power wall return spring 102 moves the power wall back to the release position shown in the drawing.

The lever reaction mechanism of booster section 44 includes a lever reaction plate 104, reaction levers 106 disposed against one edge of the lever reaction plate, and a shoulder 108 on piston 78. The reaction mechanism further includes an air valve spring 110, one end of which engages the inner ends of lever 106 and the other end of which is seated on spring retainer 112, which is fastened to air valve 90. The forward face 114 of air valve 90 has a snubber 116 which engages the inner ends of levers 106 and then yields to permit engagement of these lever inner ends with air valve face 114 when the booster is actuated. This arrangement provides a sense of feel to the vehicle operator during operation of the power booster, as is well known in the brake booster art.

The point at which booster section 44 differs from U.S. Pat. No. 3,249,021 in any material extent is in the arrangement of the booster section output mechanism. This mechanism includes a first output formed as a sleeve 118. The rear end 120 of sleeve 118 is slidably received in an aperture 122 of reaction retainer 86, the aperture and sleeve being axially aligned with air valve 90. Sleeve end 120 abuts lever reaction plate 104, and the sleeve forward end 124 extends through the forward section 126 of the booster housing 66 in sliding and sealed relation. A plunger 128 provides the second output of booster section 44 and is slidably received in sleeve 118 and is sealed in sliding relation with the inner wall of that sleeve by seal 130. The rear end of plunger 128 has a shoulder 132 abutting lever reaction plate 104. A reduced diameter extension 134 of plunger 128 extends rearwardly from shoulder 132 through an aperture 136 centrally formed in lever reaction plate 104. The rear face 138 of extension 134 is in alignment with face 114 of the air valve 90 so that the slight leftward movement of the air valve can cause mechanical engagement of the air valve and the plunger extension in force transmitting relation. The space between faces 114 and 138, with the booster section in the released position illustrated, is not sufficient to permit valve controlling operation of the booster section 44 until the second booster section has been actuated as described below. The forward end 140 of plunger 128 extends through and beyond the forward end 124 of sleeve 118 and is formed to provide a valve element of the valve controlling the hydraulic booster section 46 as will be described below.

The hydraulic booster section 46 includes a housing 146 having a bore 148 therein, the rear end of the bore having a rear wall 150 through which an opening 152 is provided. A power piston 154 is reciprocably received in bore 148 and provides a power wall for the booster section. An abutment 156 on the rearward side of valve element 158, which forms a part of piston 154, is in engagement with the forward end 124 of sleeve 118, this sleeve forward end extending through opening 152 in sealing relation therewith. The valve element 158 is mounted on piston 154 and cooperates with valve element 160 on the forward end of punger 128 to provide the control valve for the hydraulic booster section 46. Details of construction of the valve elements 158 and 160 are shown in FIG. 4 and described below in greater detail. The control valve is of the open center type and therefore the valve elements are spaced sufficiently apart to provide substantially unrestricted flow of hydraulic fluid through the valve so long as the hydraulic booster section is not actuated. Piston 154 has a passage 162 on the low pressure side of valve element 158 which communicates that side of the valve with the exhaust chamber 164. This chamber is on the forward side of piston 154 and is formed by the forward portion of bore 148. The booster section power chamber 166 is on the rearward side of piston 154 and upstream of the valve formed by elements 158 and 160. The valve element 158 has a passage 168 extending therethrough so as to interconnect chambers 164 and 166. A pressure relief valve 170, mounted in passage 162 and urged closed by spring 172, normally keeps passage 168 closed. The valve 170 will be forced open at a predetermined maximum pressure in chamber 166, which is the runout pressure for the hydraulic booster section. Piston 154 has a forward extension which becomes the master cylinder primary piston 194 described below. When separate hydraulic fluid systems for the booster and the brake circuits are used, the arrangement may be similar to that of FIG. 3 of U.S. Pat. No. 4,198,823.

Port 36 is connected by passage 174 to power chamber 166. Port 38 is connected to exhaust chamber 164. If the valve 170 and passage 168 are not provided, or if a second pressure relief arrangement is desired, a pressure relief or bypass valve passage 176 may be provided to connect passage 174 and chamber 164. Pressure relief valve 178 is mounted in passage 176. The valve is normally closed but is opened when pressure in inlet passage 174 exceeds the predetermined pressure required to open the valve. When the valve opens, it relieves the excess input pressure through passage 176 and exhaust chamber 164 to the reservoir.

The master cylinder section 48 is of the tandem type in which primary and secondary pistons are received in a common bore and pressurize brake fluid in separate pressurizing chambers for separate brake actuating circuits. The arrangement shown in FIG. 3 provides for the use of a single hydraulic fluid in the master cylinder section and the hydraulic booster section, with the master cylinder reservoir 214 acting as the hydraulic fluid reservoir for the hydraulic system including the power steering pump, power steering gear, and front and rear wheel brake circuits. To accomplish this, the power piston 154 has its extension constructed so that the extension is also the master cylinder primary piston 194, or may be directly connected thereto.

The master cylinder section 48 includes a housing 190 in which bore 192 is formed. Primary pressurizing piston 194 and secondary pressurizing piston 196 are reciprocably received in bore 192 and respectively define therewith primary pressurizing chamber 198 and secondary pressurizing chamber 200. Piston return spring 202 in chamber 200 urges piston 196 against the caged spring retainer 204. This retainer is slidably mounted on headed bolt 206, which is secured to the forward end of primary piston 194. Spring 208 is caged between piston 194 and retainer 204. When the assembly is in the brake released position illustrated this provides proper positioning of the secondary piston 196. Suitable cup seals 210 and 212 are provided on the pistons, as is well known in the art.

The master cylinder reservoir 214 includes a single primary reservoir section 216 and secondary reservoir sections 218 and 220. Each of the secondary reservoir sections has compensation ports 222, 224 and 226, 228 which provide for compensation of the brake circuits connected to each of the pressurizing chambers. The reservoir construction is based on the disclosure of U.S. Pat. No. 3,937,020, entitled "Master Cylinder" and issued Feb. 10, 1976. The particular construction is claimed in U.S. Pat. Nos. 3,877,228 and 3,886,747, each entitled "Master Cylinder Assembly and Reservoir For Same". A baffle 230 is provided for secondary reservoir 218 and a dam 232 is provided for secondary reservoir 220 to increase the capacity of that secondary reservoir. A suitable fluid level sensor 234 is provided in the primary reservoir section 216.

Primary pressurizing chamber 198 is connected by port 236 to brake conduit 52 and secondary pressurizing chamber 200 is connected by port 238 to brake conduit 50. While the schematic illustration of FIG. 1 shows the secondary pressurizing chamber 200 connected to the front brake circuit conduit 50 and the primary pressurizing chamber 198 connected to the rear brake circuit conduit 52, in some installations this may be reversed so that the front brakes are actuated by brake pressure generated in the primary pressurizing chamber 198.

When the master cylinder is actuated, piston 194 moves leftwardly, its cup seal 212 closes compensation port 226, and it begins to pressurize fluid in chamber 198. The pressurized fluid and the force exerted through spring 208 combine to move secondary piston 196 leftwardly so that its cup seal 212 closes compensation port 222, the piston continuing to move against the force of return spring 202 to pressurize brake fluid in chamber 200. The brake actuating pressures so generated in chambers 198 and 200 are respectively delivered to the rear brakes 20 and the front brakes 18 to actuate the vehicle wheel brakes.

It can be seen that the master cylinder can be actuated to generate brake actuating pressure by any of several methods. When the vehicle operator exerts manual force on the brake pedal it is transmitted through push rod 58 to air valve 90 of the vacuum booster section 44. Slight movement of air valve 90, insufficient to open the air valve relative to floating valve seat 92, causes the air valve end 114 to engage the rear face 138 of extension 134 and manually generated force from push rod 58 will be transmitted to plunger 128. Valve element 160 will move relative to valve element 158, restricting the flow of hydraulic fluid so that booster pressure is built up in chamber 166. This actuates the hydraulic booster section 46, actuating the master cylinder section 48.

Figure 2:
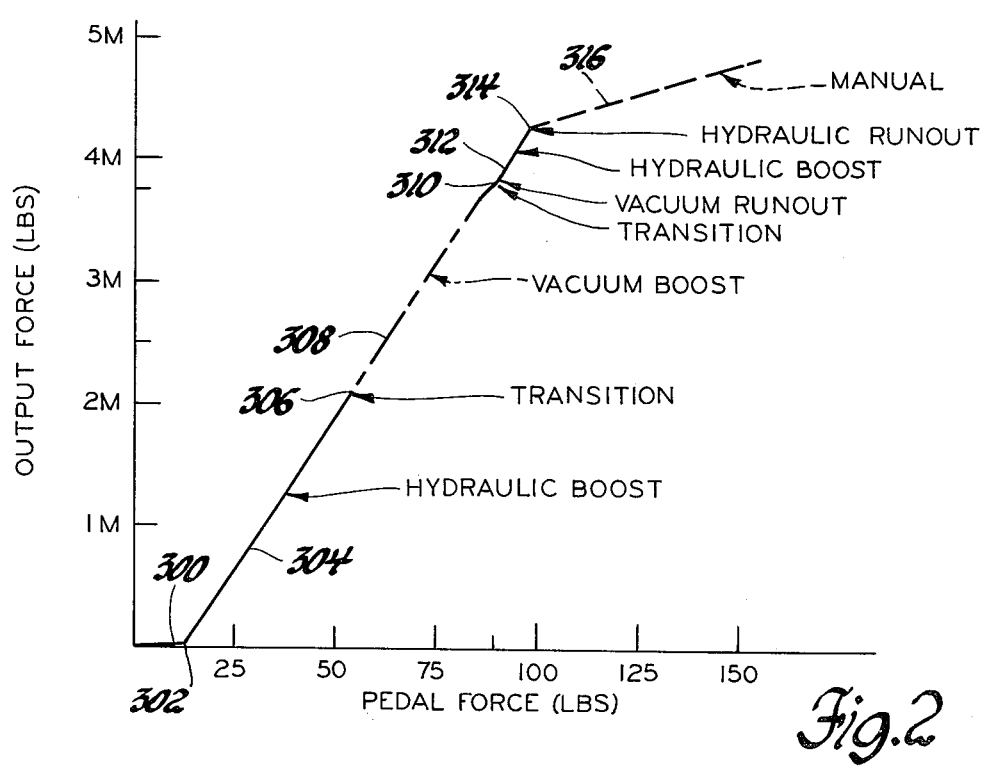
FIG. 2 is a graph indicating the performance of the brake booster under various operating conditions.

The graph of FIG. 2 illustrates the typical cycle of operation when full pedal force is exerted to obtain maximum output force from the assembly 16. The manual force needed to begin hydraulic booster actuation is represented by solid line segment 300. At point 302 the hydraulic booster begins operation, and the solid line segment 304 represents the boost operation obtained before the vacuum booster section becomes operative. As described below, the hydraulic valve elements 158 and 160 are configured to reach a hydraulic boost plateau before runout of the hydraulic booster. At the same time air valve 90 has moved sufficiently relative to piston 78 to open the air valve and begin vacuum booster operation. This occurs at the transition section 306 of the graph. The vacuum boosted force then increases, with the hydraulic boosted force plateau being maintained, as represented by the short-long dashed line segment 308 of the graph. Another transition occurs at section 310 of the graph, wherein the hydraulic boosted force begins to increase again, preferably overlapping vacuum boosted force increase as the vacuum booster approaches runout. The hydraulic boosted force then further increases, as represented by solid line segment 312, until hydraulic boost runout at point 314. Futher actuation of the master cylinder can then be obtained by manual operation as represented by dashed line segment 316. The transitory overlapping transitions give a smooth boosted operation. When the vacuum booster section 44 is producing boosted force, that force is transmitted through sleeve 118, abutment 156, valve element 158 and piston 154 to master cylinder piston 194.

The hydraulic booster control valve configuration achieving the desired method of generating brake actuating pressure is illustrated in FIG. 4. The valve element 158 is a valve seat formed by an axially extending cylindrical seat passage 318 defined by a cylindrical wall 320. This passage provides fluid communication from chamber 166 to chamber 164 through passages 162 and castellations in abutment 156. The rear edge 322 of wall 320 is an integral part of the valve seat. The valve element 160 has a cylindrical nose section 324 terminating at its forward end in a beveled edge. Nose section 324 always extends into the cylindrical seat passage 318 and is radially spaced inwardly from the passage wall 320 to provide a substantially unrestricted cylindrical fluid flow passage 326. A beveled shoulder 328 joins the cylindrical nose section 324 with a larger diameter cylindrical valve section 330 having a diameter slightly less than the diameter of the passage wall 320. When section 330 extends into the seat passage 318 there is a substantially constant restrictive cylindrical flow passage 332 defined between wall 320 and the cylindrical surface of section 330. A second beveled shoulder 334 extends from section 330 and has a larger maximum diameter than the diameter of wall 320.

When the hydraulic booster section is actuated, shoulder 328 moves toward seat edge 322 and begins to restrict fluid flow therebetween. As the amount of restriction increases, the booster pressure in chamber 166 increases. This is represented by solid line segment 304 of the graph of FIG. 2. The vacuum booster section is actuated as the juncture of shoulder 328 and cylindrical valve section 330 approaches seat edge 322. Section 330 then enters the passage 318 defined by wall 320 and the restrictive cylindrical flow passage 332 becomes active. Its restrictive action remains substantially constant as section 330 moves further into the passage 318, so there is no increase in hydraulic boosted force for this range of movement. While forward movement of the valve section 330 is taking place in this range, the vacuum booster section is increasing the boosted force as represented by line segment 308 of the graph. The amount of allowable forward movement of section 330 within passage wall 320 is substantially equal to the range of movement of the input member, formed by push rod 58 and air valve 90, to actuate and control the actuation of the vacuum power section 44 so that the hydraulic power section 46 has no increase in actuation during that range of movement. Movement of the input member in a further range of movement beyond the range of movement noted above causes the second beveled shoulder 334 to approach edge 322 and further restrict fluid flow through the passage 318. This further increases actuation of the hydraulic power section 46 during the transition from vacuum boost force increase and thereafter, after actuation of the vacuum booster section 44 is completed. When shoulder 334 engages edge 322 to completely block off hydraulic fluid flow through the passage 318, and relief valve 170 or 178 opens, the hydraulic booster section has reached runout. Any further master cylinder actuation is then accomplished by manual force transmitted through air valve 90, plunger 128, shoulder 334, edge 322, valve element 158 and pistons 154 and 194.

In normal operation, the required brake actuating pressure is usually less than the maximum available, and is generated only by so much of the sum of the hydraulic boost, vacuum boost and manual forces applied to the master cylinder as is necessary to generate the required brake actuating pressure.

The embodiments of the invention in which an exclusive property or privilege is claimed are defined as follows:

1. In a dual power brake booster:
   a first power booster section having an input member operable within first and second ranges of movement wherein said second range of movement starts before and ends after said first range of movement and a part of each range is concurrent, and first valve means in said first power booster section responsive to said input member for controlling actuation of said first power booster section within said first range of movement of said input member to provide a boosted force; and
   a second power booster section including a second valve means having a seat member and a valve member relatively movable in response respectively to first and second inputs from said first power booster section, one of said members receiving said boosted force as said first input from said first power booster section and the other of said members receiving said second input from said first valve means when said input member operates throughout said second range of movement thereby cooperatively to control said second valve means for controlling actuation of said second power booster section;
   said seat and valve portions being so configured during relative movement thereof to cause said second power booster section to be actuated in sequence (a) to a predetermined booster force value during movement of said input member in said second range of movement before its first range of movement, (b) to maintain the predetermined booster force thus actuated at a substantially constant value during movement of said input member in the part of each range of movement which is concurrent until said first power booster section is actuated to power runout, and (c) to increase the booster force thus maintained until said second power booster section is actuated to power runout while said input member is moving in the part of its second range of movement which is after its first range of movement.

2. In a dual power brake booster:
   a first power booster section having an input member and first valve means controlling actuation of said first power section within a first range of movement of said input member;
   a second power booster section having a second valve means and first and second inputs from said first power booster section, said first input receiving boosted force from said first power section and said second input being responsive through a part of said first valve means to movement of said input member within a second range of movement beginning before and ending after said first range of movement to control said second valve means;
   and means forming a part of said second valve means causing said second power booster section to be actuated to a predetermined booster force value during movement of said input member before its first range of movement, then causing said second power section to maintain its predetermined booster force at a substantially constant value during movement of said input member in its second range of movement wherein said first power booster section is actuated to power runout and then causing further actuation of said second power booster section to further increase the booster force therefrom up to power runout thereof while said input member is moving in its second range of movement beyond its first range of movement.

3. In a brake booster assembly having an input member and an output member, a first power section having said input member as the input thereof, a second power section having said output member as the output thereof, said first power section having two parallel acting outputs which are also inputs for said second power section, first control means for said first power section including first valve means controlling the actuation of said first power section in response to a first range of movement of said input member and subject to power provided thereto, second control means for said second power section including second valve means controlling the power actuation of said second power section in accordance with a range of movement of one of said inputs for said second power section, the improvement comprising:
   said range of movement of one of said inputs for said second power section being responsive to a second range of movement of said input member encompassing said first range of movement thereof;
   said second valve means including an annular valve seat having a cylindrical seat passage extending therethrough; an annular control valve having a cylindrical nose section always extending into said cylindrical seat passage and radially spaced therefrom to provide a substantially unrestricted cylindrical fluid flow passage, a first beveled shoulder joining said cylindrical nose section with a large diameter cylindrical valve section having a diameter slightly less than the diameter of said cylindrical seat passage and when extending into said cylindrical seat passage providing a substantially constant restrictive cylindrical fluid flow passage within said cylindrical seat passage, and a second beveled shoulder extending from said cylindrical valve section and of larger maximum diameter than said valve seat so as to approach and engage said valve seat to further restrict fluid flow through said second valve means after said cylindrical valve section has moved entirely into said cylindrical seat passage;

the allowable amount of movement of said cylindrical valve section within said cylindrical seat passage being substantially equal to the first range of movement of said input member to actuate and control the actuation of said first power section so that said second power section has no increase in actuation during said first range of movement, movement of said input member in said second range of movement beyond said first range of movement causing said second beveled shoulder to further restrict fluid flow through said second valve means and further increase actuation of said second power section after actuation of said first power section is completed.

4. A method of generating a required brake actuating pressure comprising the steps of:
   (a) applying a linearly directed manual control force to a member;
   (b) from a first power source generating a first booster output force applied to a brake actuating pressure generator in linear series with said manual control force, in accordance with the amount of manual control force applied to the member, to a first booster output force value;
   (c) from a second power source generating a second booster output force applied to the brake actuating pressure generator in linear series with said manual control force in accordance with the amount of additional manual control force applied to the member and in transitory overlapping and linear series with said first booster output force to a second booster output force value greater than said first booster output force value;
   (d) from said first power source generating a third booster output force applied to the brake actuating pressure generator in linear series with said manual control force in accordance with the amount of additional manual control force applied to the member and in transitory overlapping linear series with said second booster output force to a third booster output force value;
   (e) and generating brake actuating pressure by so much of the sum of said booster output forces applied to the brake actuating pressure generator as is necessary to generate the required brake actuating pressure.

5. A method of generating a required brake actuating pressure comprising the steps of:
   (a) applying a linearly directed manual control force to a member;
   (b) from a hydraulic power source generating a first booster force applied to a brake actuating pressure generator in linear series with said manual control force, in accordance with the amount of manual control force applied to the member, to a first booster force value;
   (c) from a vacuum pressure power source generating a second booster force applied to the brake actuating pressure generator together in linear series with said manual control force in accordance with the amount of additional manual control force applied to the member and in transitory overlapping linear series with said first boosted force to a second boosted force value greater than said first booster force value;
   (d) from said hydraulic power source generating a third booster force applied to the brake actuating pressure generator in linear series with said manual control force in accordance with the amount of additional manual control force applied to the member and in transitory overlapping linear series with said second boosted force to a third booster force value;
   (e) and generating brake actuating pressure by so much of the sum of said forces applied to the brake actuating pressure generator as is necessary to generate the required brake actuating pressure.

6. A method of generating a required brake actuating pressure comprising the steps of:
   (a) applying a linearly directed manual control force to a member;
   (b) from a first power source generating a first booster output force applied to a brake actuating pressure generator in linear series with said manual control force, in accordance with the amount of manual control force applied to the member, to a first booster output force value;
   (c) from a second power source generating a second booster force applied to the brake actuating pressure generator in linear series with said manual control force in accordance with the amount of additional manual control force being applied to the member and in transitory overlapping and linear series with said first booster output force to a second booster output force limit established by the amount of power available from said second power source for such generation;
   (d) from said first power source generating a third booster output force applied to the brake actuating pressure generator in linear series with said manual control force in accordance with the amount of additional manual control force being applied to the member and in transitory overlapping linear series with said second booster output force to a third booster output force limit established by the amount of power available from said first power source for such generation;
   (e) and generating brake actuating pressure by so much of the sum of said booster output forces applied to the brake actuating pressure generator as is necessary to generate the required brake actuating pressure.

7. A method of generating a required brake actuating pressure comprising the steps of:
   (a) applying a linearly directed manual cohtrol force to a member;
   (b) subject to power availability from a first power source generating a first booster output force applied to a brake actuating pressure generator in linear series with said manual control force and generating brake actuating pressure, in accordance with the amount of manual control force applied to the member, to a first booster output force value established by only a portion of the amount of power available from said first power source for such generation;
   (c) subject to power availability from a second power source generating a second booster output force concurrently with generation of at least a part of the first booster output force and continuing beyond the generation of said first booster output force, said second booster output force being applied to the brake actuating pressure generator in linear series with said manual control force and said first booster output force and generating additional brake actuating pressure, in accordance with the amount of additional manual control force applied to the member, to a second booster output force limit established by the amount of power available from said second power source for generation;

(d) subject to remaining power availability from said first power source generating a third booster output force concurrently with generation of the last generated portion of said second booster output force and continuing beyond the generation of said second booster output force, said third booster output force being applied to the brake actuating pressure generator in series with said manual control force and said first and second booster output forces and generating additional brake actuating pressure, in accordance with the amount of additional manual control force applied to the member, to a third booster output force limit established by the amount of power available from said first power source for such generation;

(e) further applying increased manual force to the member in series with said other forces beyond said boosted force limits;

(f) and generating brake actuating pressure by only so much of the sum of said booster output forces applied to the brake actuating pressure generator as is necessary to generate the required brake actuating pressure.

* * * * *

UNITED STATES PATENT AND TRADEMARK OFFICE
CERTIFICATE OF CORRECTION

PATENT NO. : 4,458,490

DATED : July 10, 1984

INVENTOR(S) : Delbert W. Newhouse

It is certified that error appears in the above-identified patent and that said Letters Patent is hereby corrected as shown below:

Column 10, line 47, "cohtrol" should read -- control --.

Signed and Sealed this

Twenty-eighth Day of May 1985

[SEAL]

Attest:

DONALD J. QUIGG

Attesting Officer  Acting Commissioner of Patents and Trademarks